Figure 1:
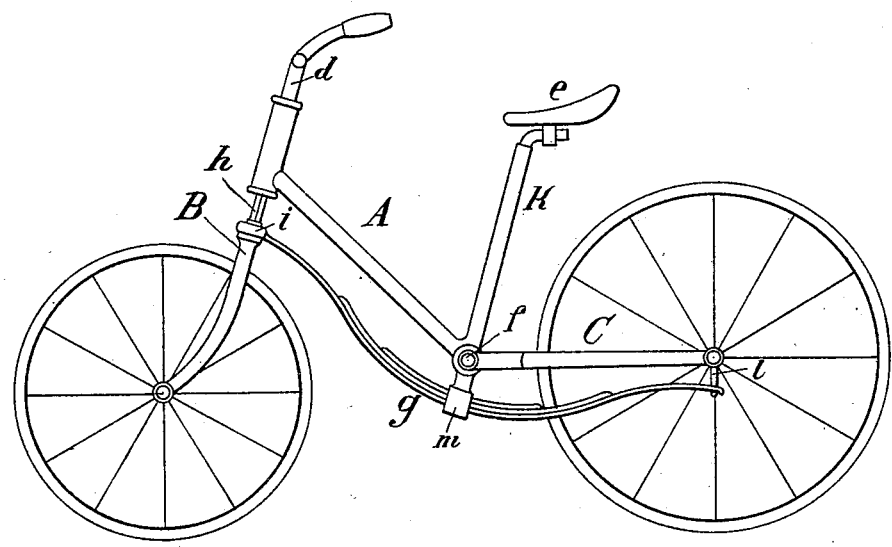

No. 645,474. Patented Mar. 13, 1900.
K. KIEFER.
BICYCLE.
(Application filed May 22, 1896.)
(No Model.) 2 Sheets—Sheet 1.

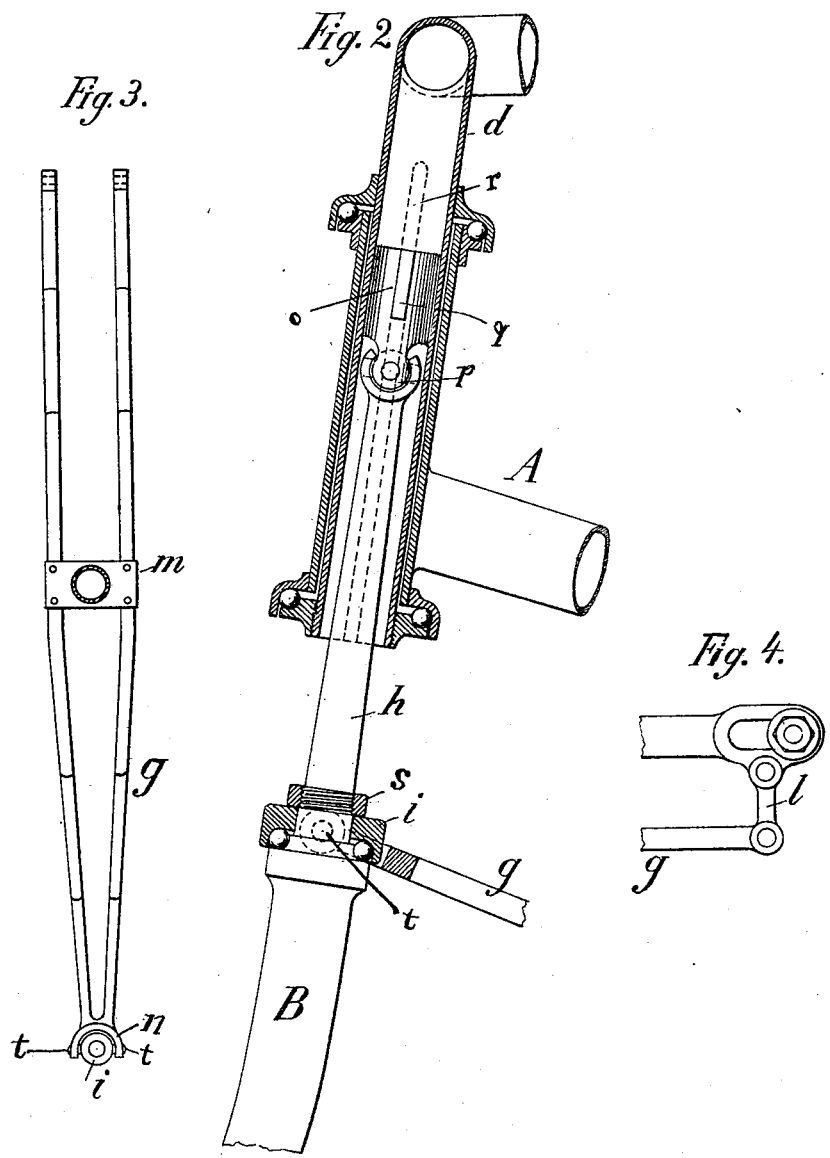

United States Patent Office.

KARL KIEFER, OF CINCINNATI, OHIO.

BICYCLE.

SPECIFICATION forming part of Letters Patent No. 645,474, dated March 13, 1900.

Application filed May 22, 1896. Serial No. 592,676. (No model.)

*To all whom it may concern:*

Be it known that I, KARL KIEFER, a citizen of Germany, residing in Cincinnati, in the county of Hamilton and State of Ohio, have invented certain new and useful Improvements in Bicycles; and I hereby declare that the following is a full, clear, and exact description of the invention, which will enable others skilled in the art to which it appertains to use the same.

My invention relates to improvements in bicycles.

The objects of my improvements are to make a bicycle-frame which instead of being rigidly connected with the wheels is connected with them by the intervention of springs. This will afford more comfort to the person riding the machine. The wheels do not necessarily have to be of the pneumatic type, doing away with the nuisance of pneumatic tires. The strain on the bicycle-frame is taken away and placed on the springs. I attain these objects by the combination illustrated in the accompanying drawings. They illustrate the new feature, so that other persons skilled in the art to which the invention appertains may be able to construct such a machine.

Figure 1 shows the whole bicycle, including all parts claimed as new. Fig. 2 shows the steering-head broken away to show the details of the sliding stem $h$. Fig. 3 is a view upon the main spring of the machine. Fig. 4 shows the connection between spring and rear fork.

The bicycle consists of the main frame A, front fork B, carrying the front wheel, spring $g$, and rear fork C, carrying the rear wheel. The main frame A comprises the bearings for the handle-bar tube $d$, the seat-post tube $k$, with seat $e$, the bearings for the crank-shaft $f$, and the connection $m$, where the spring $g$ is rigidly fastened.

B is the fork for the reception of the front wheel. The same is longitudinally movable in the handle-bar of tube $d$. The stem $h$ of fork B is, however, so constructed that it cannot be twisted within the handle-bar tube $d$, so that the turning of the handle-bar tube $d$ causes the fork B to also turn. This may be done in the way shown in Fig. 2, where the stem $h$ is connected with the sliding piece $o$ by universal joint $p$. The sliding piece $o$ has a feather $q$, which fits in the slot $r$ of the handle-bar tube $d$. This arrangement, however, can be changed in various other ways which allow to the stem $h$ a longitudinal movement and the little side movement which the oscillation of the spring $g$ will cause it to make.

C is the fork for the rear wheel. It is journaled concentrically with the crank-shaft $f$.

The bicycle is propelled by the common chain arrangement, the big sprocket-wheel being seated on the crank-shaft $f$ and the small sprocket-wheel rigidly connected with the rear wheel. It is evident that the rear wheel may be revolved around the crank-shaft $f$ with its fork C without interfering with the sprocket and the chain arrangement. The latter being known is not illustrated, in order not to obstruct the drawings.

The spring $g$ is rigidly connected with the main frame A by a prolongation of the seat-carrying tube $k$. It acts on the front wheel in the following manner: Collar $i$ is slipped over stem $h$ and bears upon front fork B by means of a series of balls. Collar $i$ is kept in place by the nut $s$. By means of this ball-bearing the collar $i$ can turn easily on stem $h$. The connection between the spring $g$ and collar $i$ is attained in the following manner: The end of spring $g$, Fig. 3, is jointed in a yoke $n$, in which the collar $i$ swings around pinions $t$ similar to a compass-hanging. It is easily seen that by this arrangement the front fork B can revolve within collar $i$ and also follow the vibration of spring $g$. The rear fork C is connected by links $l$ with the springs $g$ in order to allow the spring $g$ the proper play, Figs. 1 and 4.

The spring $g$ may be of the common carriage-spring order, composed of one or more flat pieces of steel or also of wood.

I do not limit myself to the details of the spring with its connections to the forks nor to the connection of the front fork with the handle-bar tube $d$. This might be done by the most convenient method without being out of the scope of my invention.

I am aware that springs of different arrangements have been employed prior to this invention, and I do not claim the application of springs broadly.

What I claim as my invention, and desire to obtain Letters Patent for, is—

1. In a bicycle the combination of a main frame A, containing bearings for the handle-bar tube $d$, bearings for the rear fork C, bearings for the crank-shaft $f$, the spring $g$ rigidly attached to the main frame A, a front fork B movable longitudinally in the handle-bar tube $d$, and being engaged by the spring, a rear fork C, having its fulcrum concentric with the crank-shaft $f$, and linked to the spring $g$ near the rear-wheel axle, substantially as described.

2. In a bicycle the combination of a frame A, connected to which are all parts coming in contact with the rider, said frame rigidly attached near the crank-bearings to the approximate center of a spring $g$, the latter bearing on the front fork by means of yoke $n$ and collar $i$ and connected to the rear fork by suitable means.

3. In a bicycle the combination of a front fork movable in the steering-head, and a rear fork, a spring extending from the rear axle to the front fork, and bearing on both, and having rigidly attached over the approximate center of said spring a frame containing the seat for the rider, bearings for the crank-shaft and for the handle-bar.

4. In combination, in a bicycle-frame, a handle-bar stem rotatably journaled in the steering-head, a sliding piece movable longitudinally in said stem and having means to prevent its rotation relative to the head, a fork-stem loosely projecting into and yieldingly held in relation to the steering-head and connected to said sliding piece by a universal joint, substantially as described.

KARL KIEFER.

Witnesses:
 CHAS. L. RICHTER,
 EMILE KAHN.